United States Patent [19]

Long et al.

[11] Patent Number: 4,539,336

[45] Date of Patent: Sep. 3, 1985

[54] MODIFIED POLYIMIDE/POLYIMIDE-AMIDE FOAMS AND METHODS OF MAKING SAME

[76] Inventors: John V. Long, 1756 E. Lexington Ave., El Cajon, Calif. 92021; John Gagliani, 6280 Lance Pl., San Diego, Calif. 92120

[21] Appl. No.: 678,992

[22] Filed: Dec. 6, 1984

[51] Int. Cl.³ ............................................... C08J 9/02
[52] U.S. Cl. ...................................... 521/77; 521/117; 521/185; 521/189
[58] Field of Search ................... 521/77, 117, 185, 189

[56] References Cited

U.S. PATENT DOCUMENTS

| | | | |
|---|---|---|---|
| 4,394,464 | 7/1983 | Gagliani et al. | 521/189 |
| 4,425,441 | 1/1984 | Gagliani et al. | 521/189 |
| 4,426,463 | 1/1984 | Gagliani et al. | 521/180 |

*Primary Examiner*—Morton Foelak
*Attorney, Agent, or Firm*—Frank D. Gilliam

[57] ABSTRACT

Methods of making modified polyimide/polyimide-amide foams having selected compressive resistance and density characteristics and the resulting compositions. A suitable aromatic dianhydride is mixed with a suitable oxoimine and alcohol, which initially is believed to form a monoimide which is substantially/simultaneously esterified by the alcohol. To this mixture is added a suitable diamine to produce a polyimide forming material. This material is dried to a powder or film. A foam is produced by heating the material to reaction temperature for a period sufficient to produce a stable foam. The material melts, then spontaneously expands into a foam which becomes self supporting and cures to a resilient flexible foam. Depending upon heating conditions, a polyimide, polyimide-amide or mixture thereof may be produced, resulting in foams having varying physical properties. Within the mole ratio range of oxoimine to dianhydride of about 1.5:1 to about 0.05:1 the compressive resistance of the final foam can be selected in accordance with the intended end use of the foam. Density and compressive resistance varies inversely with the oxoimine quantity in the ratio, being greatest with the 0.05:1 ratio and lowest with the 1.5:1 ratio.

23 Claims, No Drawings

MODIFIED POLYIMIDE/POLYIMIDE-AMIDE FOAMS AND METHODS OF MAKING SAME

BACKGROUND OF THE INVENTION

This invention relates in general to polyimide resins and, more specifically, to simplified methods for making resilient, flame resistant modified polyimide and polyimide-amide foams.

Prior U.S. Pat. Nos. 4,161,477, 4,183,838 and 4,183,839 disclosed and claimed certain polyimide compositions which are flame resistant and useful as coatings and adhesives.

The coating and adhesive compositions described in the above-mentioned prior patents are made by first preparing a suitable bisimide by reacting an aromatic tetracarboxylic acid dianhydride with a cyclic amide or oxoimine. The ratio of oxoimine to dianhydride is preferably in the 2.3:1 to 2.7:1 range and the imidization reaction is preferably conducted at a temperature of 170°–200° C. for 20–60 minutes.

The polyimide forming material is then prepared by dissolving the bisimide in an inert solvent; then adding thereto a suitable diamine, producing a viscous fluid containing an intimate, unpolymerized mixture of N-substituted cyclic bisimide dicarboxylic acid and diamine which is capable of being converted to a high molecular weight polymer by the application of heat.

The solution is coated onto a surface and polymerized by heating to a temperature in the 177°–316° C. range for 30 minutes to 5 hours. The following is exemplary of the exchange reaction which occurs:

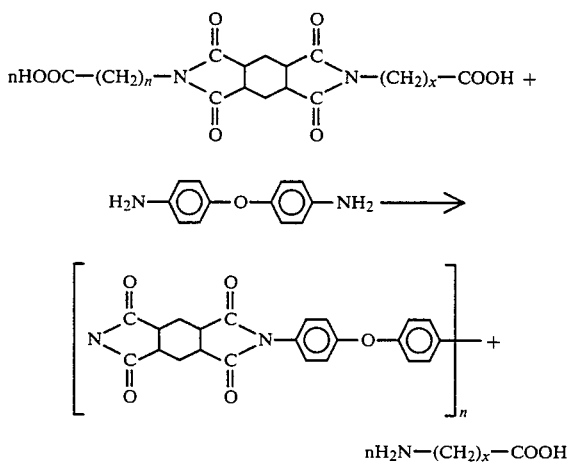

where n is a positive integer and x is 2–7.

The resulting coating is tough, highly adherent to various surfaces, with very few pinholes or bubbles. It has excellent peel strength and is resistant to high temperatures, peeling and abrasion.

The prior coating material, however, was not suitable for use in applications requiring a cellular or foam material, since conventional agitation foaming and addition of known blowing agents add to process coats and complexity and are not entirely effective at the relatively high polymerization temperature required.

A method of producing polyimide foams which overcomes many of these problems is described in our earlier U.S. Pat. Nos. 4,394,464 and 4,426,463. In that method, an aromatic dianhydride was reacted with an oxoimine at a temperature of about 150° C. to 200° C. to produce an N-substituted aliphatic imide. The resulting product was cooled below about 70° C. and dissolved in a reactive solvent esterifying agent and heated to reflux for at least 60 minutes to esterify the imide. The excellent, flame resistant, resilient foam could then be produced by heating the dry material to at least about 120° C. for a suitable period.

While our prior method produced excellent polyimide foams, that method is undesirably complex, requiring a number of sequential steps to be performed at varying, relatively high, temperatures. This tended to result in high energy costs and varying product characteristics due to processing variations.

SUMMARY OF THE INVENTION

We have now found that, by suitably varying reaction conditions and certain ingredients, within specified limits, materials similar to those described above and in out cited prior patents can be used to produce a resilient, flame resistant, modified polyimide cellular structure, through a simple, easily controlled and energy efficient series of steps. For the purposes of this application, "modified polyimide" will be used to mean a mixture of polyimide and polyimide-amide resins varying from almost entirely polyimide to almost entirely polyimide-amide.

The basic steps in producing out improved resilient foam are reacting a suitable aromatic dianhydride with a suitable oxoimine in alcohol in a ratio to dianhydride between about 1.5:1 and 0.05:1 at a temperature of about 60° to 120° C. over about 30 to 90 minutes, adding a suitable diamine and any desired additives, drying the solution to a film or powder and finally heating the dry material to a temperature sufficient to cause the dry material to melt and spontaneously foam. The heating causes the dry material to simultaneously undergo a condensation reaction and an exchange reaction. The condensation reaction produces water and alcohol vapors which cause the molten mass to expand. As the reactions proceed, the molten mass forms a cellular structure which becomes self-supporting and finally cures to an imide and/or an imide-amide polymer depending on heating conditions.

DETAILED DESCRIPTION OF THE INVENTION

Any suitable aromatic dianhydride may be used in the preparation of the desired imides. Typical aromatic dianhydrides include those described and referenced in the patents listed above. Due to their ready availability at reasonable prices and the excellent foams which result, pyromellitic dianhydride and 3,3′,4,4′ benzophenone tetracarboxylic acid dianhydride (BTDA) are preferred.

Any suitable oxoimine may be reacted with the selected dianhydride to produce the desired imide. Preferably, the oxoimine has the general formula:

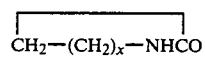

where "x" is a positive integer from 2 to 7. Preferably, "x" is in the 2 to 4 range. Of these, best results are obtained with caprolactam because its larger ring structure tend to open more easily with heat and react with the aromatic dianhydride.

Other preferred oxoimines are 2-piperidone, 2-pyrrolidone and amino acids derived from these three preferred cyclic lactams, namely 6-amino caproic acid, 5-amino valeric acid and 4-amino butyric acid. These preferred oxoimines may be each used alone or may be combined in any suitable mixtures. For the purpose of this patent application, the term "oximines" will be considered to include cyclic lactams as described above and the three amino acids mentioned in this paragraph.

While any suitable reaction conditions may be used, we have obtained the best results where the dianhydride and oxoimine are mixed together, the alcohol is added and the mixture is heated to a temperature of about 65 to 120 deg. C. for about 30 to 90 minutes. Optimum results are obtained at reflux temperature (about 68 deg. C. for about 30 to 40 minutes. It appears that initially the dianhydride and oxoimine react to form a animide, which is immediately esterified by the alcohol.

In order to produce a superior foaming material, we have found that it is essential that the mole ratio of oxoimine to dianhydride be in the range of about 1.5:1 to 0.05:1. Above this range, the material forms a coating without foaming, while below this range excessively rigid material is produced. Within this range, optimum results occur with a mole ratio of oxoimine to dianhydride is in the range of about 0.5 to 0.05 to 1. Within this range, the compressive resistance of the foam increases with decreasing ratios of oxoimine. This property is important in providing foams of various compressive resistance values for use in various specific applications. We have found the ideal combination use caprolactam as the oxoimine and BTDA as the dianhydride. The compressive resistance value required for a given application can be selected simply by selecting the appropriate quantity of caprolactam.

The imides produced by the dianhydride/oxoimine reaction have the general formula:

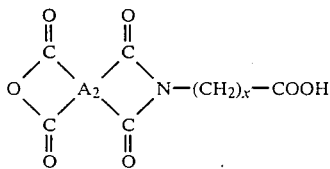

wherein "x" is an integer from 2 to 7 and "$A_2$" is selected from the group consisting of:

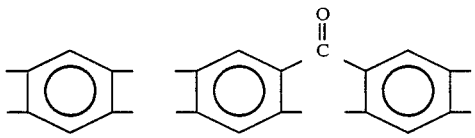

and mixtures thereof.

The imide thus produced is believed to be essentially simultaneously esterified by the alcohol. Any suitable alcohol which acts as an esterifying agent may be used. Typical of these are aliphatic alcohols having up to 7 carbon atoms and aromatic alcohols, which may have halogen or amino substitutions and mixtures thereof. Best results have been obtained with methyl alcohol. The esterification reaction appears to take place as follows:

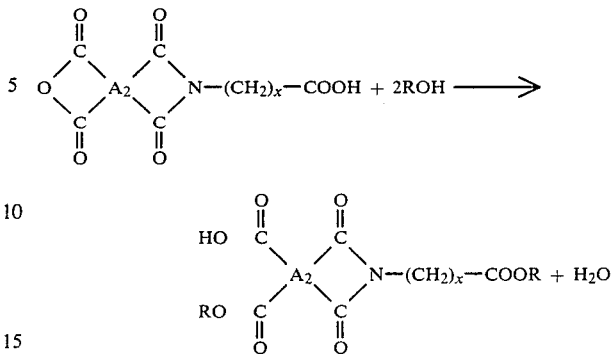

wherein "x" is an integer from 2 to 7, "$A_2$" is as listed for the imide above and "R" is an aliphatic or aromatic radical which may have halogen or amino substitutions. This esterification may take place under any suitable conditions. Typically, a mole ratio of imide to alcohol esterifying agent of from about 1:5 to 1:10 is preferred to assure rapid esterification at reflux temperature.

Once the esterification is complete, the selected diamine or diamines are added to the solution. Preferably, an approximately stoichiometric quantity of diamine is used.

Any suitable diamine may be used. Typical diamines include meta-phenylene diamine, para-phenylene diamine; 4,4'-diaminodiphenyl ether, 4,4'-diaminodiphenyl sulfone, 3,3'-diaminodiphenyl sulfone, 4,4'-diaminodiphenyl sulfide, 4,4'-diaminodiphenyl methane, 3,3' diaminodiphenyl methane and mixtures thereof. Of these, best results are obtained with 4,4'-diaminodiphenyl methane which is, therefore, preferred. If desired aliphatic diamines may be used in combination with these aromatic diamines. Typical aliphatic diamines include 1,3-diamino propane, 1,4 diamino butane, 1,6-diamino hexane, 1,8-diamino octane, 1,12 diamino dodecane and mixtures thereof. We have found that best results are obtained where the aromatic diamine containes a methylene bridge. Optimum results have been obtained with a mixture of 4,4'-diamine diphenyl methane and 1,6-diamino hexane.

Additives to improve various characteristics of the final foam may be added as desired. Any appropriate additives may be used, such as fillers, surfactants to improve uniformity of the cellular structure, ultraviolet absorbers or the like. Typical surfactants include Dow Corning Corp. 190 or 193, (a silicone surfactant), FC430 from Minnesota Mining & Manufacturing Co., Zonyl FSC from E. I. duPont de Nemours & Co., L550 from Union Carbide Corp. and BRIJ 78, a polyoxyethylene ether from ICI America. While any suitable concentration may be used, from about 0.01 to 2% (by weight, based on the weight of the solution prior to drying) is preferred. Of these surfactants, best results have been obtained with BRIJ 78. Fillers and reinforcing additives may be added prior to drying the resin. Typical fillers include Kevlar aramid fibers, graphite fibers, glass fibers, carbon and graphite fibers, Teflon flurocarbon powders and mixtures thereof.

The solution is then dried by any suitable method. Simply heating the solution in an oven to a temperature of about 65°–95° C. until dry is satisfactory. Other conventional methods, such as spray drying, rotary drying, thin film evaporation, etc. may be used as desired. The resulting free-flowing powder or flakes may be further ground or treated as desired and may be stored indefinitely at room temperature.

The final step in converting the powder into a foam is accomplished by heating the powder to the selected foaming temperature for a suitable period.

The reaction which takes place is quite complex, since it is a combined condensation and exchange reaction. When the exchange reaction is forced to completion by higher temperatures and/or prolonged heating, in the range of 230°–315° C. for 30–60 minutes (optimally, about 260° C. for about 45 minutes) the polyimide structure is primarily formed as shown by the following general reaction:

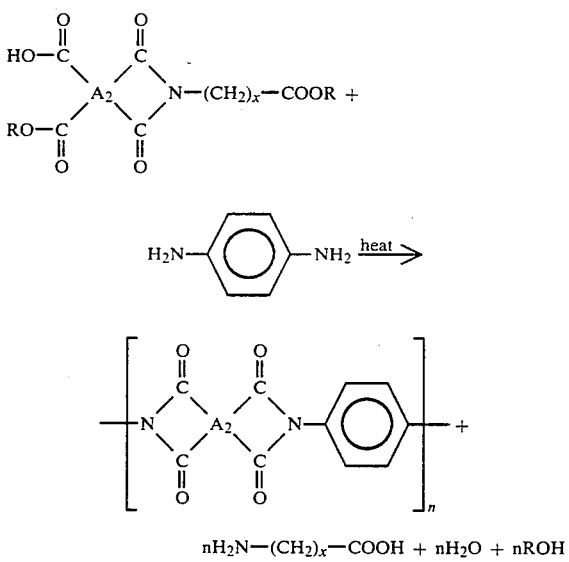

$$nH_2N-(CH_2)_x-COOH + nH_2O + nROH$$

where "x" is an integer from 2 to 7 and $A_2$ as listed for the imide above.

If, however, the exchange reaction is stopped prior to completion the products of the intermediate condensation reaction will still be present, so that a variable (depending on reaction time, temperature and conditions) amount of a polymer having the following imide-amide structure will remain:

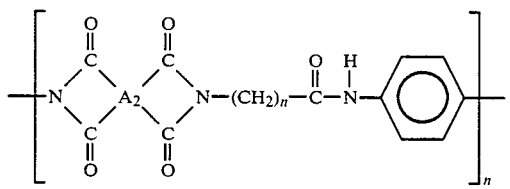

where "x" is an integer from 2 to 7 and $A_2$ is a radical as listed for the imide above.

As the powder is heated it first melts and, as the condensation reaction begins, water and alcohol are released and vaporized, causing the molten mass to expand. The resulting cellular structure becomes self-supporting and finally cures to an imide and imide-amide polymer, with proportions of the two polymers depending on heating (time and temperature) conditions. The resulting foam is tough, resilient and will not emit significant smoke or toxic by-products when exposed to open flame.

Where substantially entirely imide-amide foam is desired, heating should be at from about 120° C. to about 220° C. for about 10 to 40 minutes, with optimum results at about 190° C. for about 30 minutes. As temperature is increased above this range (and the somewhat longer heating period is used) the proportion of polyimide will increase. The foam is more flame resistant, but less flexible, with the higher proportion of polyimide. Thus, by varying heating conditions flexibility and flame resistance can be tailored to meet specific requirements.

Details of the invention will be further understood upon reference to the following examples, which describe preferred embodiments of the methods and compositions of this invention. All parts and percentages are by weight, unless otherwise indicated.

EXAMPLE I

About 322.23 g. (1M) of 3,3',4,4'-benzophenonetetracarboxylic acid dianhydride (BTDA) and about 45.26 g. (0.4M) caprolactam are placed in a 3 liter flask and about 250 g of methyl alcohol is added. This mixture is heated to reflux temperature (about 75° C.). Reflux is continued until the mixture appears clear, about 60 minutes. The mixture is cooled to about 55° C. and about 168.5 g. (0.85M) 4,4'-diaminodiphenyl methane and about 17.4 g (0.15M) of 1,6-diaminohexane are added. This mixture is refluxed (at about 75° C.) for about 15 minutes, then is cooled to room temperature and poured into a shallow aluminum dish. The resulting thick liquid is dried for about 3 hours at about 65° C. The dry residue is removed from the dish and placed in an oven pre-heated to about 230° C. After about 30 minutes of heating, the material is found to have expanded into a flexible, resilient foam sheet having a homogenous cellular structure. When exposed to an open flame, the foam produces no visible smoke. This foam is found to consist primarily of polyimide.

EXAMPLE II

The procedure of Example I is repeated four additional times, varying only the quantity of caprolactam used. Where Example I used about 45.26 g. (0.4M) of caprolactam to give a molar ratio of caprolactam to BDTA of about 0.4:1, the four additional experiments use caprolactam quantities of about: I(a) 5.66 g, 0.05:1 ratio, II(b) 11.32 g, 0.1:1 ratio, III(c) 22.64 g, 0.2:1 ratio, IV(d) 45.24 g, 0.4:1 ratio, II(e) 169.8 g, 1.5:1 ratio and II(f) 226.4 g, 2:1 ratio. The foam produced in experiments II(a) through II(d) have excellent foam characteristics but different foam rise and consequently different density. The material produced in II(e) has low rise, and that of II(f) does not foam. The density of foam decreased from the sample of II(a) to that of III(d). All other properties related to density will similarly vary. Therefore, the compressive resistance of the foams increases with decreasing ratios of caprolactam, conversely, increases with increasing ratios of dianhydride.

EXAMPLE III

The procedures of Example I are repeated, except that in place of methanol, the following solvents are used: III(a) isopropyl alcohol, III(b) aminoethyl alcohol, III(c) benzene, III(d) dimethyl acetamide and III(e) acetone. In each case [III(a) and III(b)] where a reactive alcohol solvent is used to esterify the imide, an excellent foam results. Where an inert solvent is used, in III(c) through III(e), foaming does not take place.

EXAMPLE IV

The procedure of Example I are followed with five samples, but only up to the heating to foam step. The five dry powder samples are placed in preheated circulating air ovens at the following temperatures for the following time periods: IV(a) about 125° C. for about 120 minutes., IV(b) about 200° C. for about 30 minutes, IV(c) about 220° C. for about 10 minutes, IV(d) about 235° C. for about 90 minutes, and IV(e) about 310° C. for about 30 minutes. Each sample forms a foam of good resiliency and flame resistance. Samples IV(a) and IV(b) are found to be primarily imide-amide and to have outstanding flexibility but lower flame resistance. Example IV(c) is found to be a relatively even mix of imide and amide-imide and to have intermediate flexibility and flame resistance. Examples IV(d) and IV(e) are found to be primarily polyimide and to have less flexibility but outstanding flame resistance. In general, higher temperature and longer heating periods produce a greater polyimide proportion and a stiffer foam. The higher temperatures are found to be more significant than the longer heating periods in producing the high polyimide foams.

EXAMPLE V

The procedures of Example I are repeated, except that the following diamines are used in place of the mixture of 4,4'-diaminodiphenyl methane and 1.6-diaminohexane: V(a) m-phenylene diamine (1M), V(b) 4,4'-diaminodiphenyl sulfone (1M), V(c) 4,4'-diaminodiphenyl oxide (0.5M) and 1,3diamino propane (0.5M), V(d) 4,4'-diaminodiphenyl oxide (0.1875M) and 4,4'-diaminodiphenyl sulfide (0.1875M). In each case the resulting foam has a uniform cellular structure and has excellent heat and flame resistance. The flexibility and resiliency varies somewhat among the sub-examples.

EXAMPLE VI

The procedures of Example I are repeated with the only change being the substitution of the following oxoimines for the 0.25M caprolactam specified in Example I: VI(a) 2-pyrrolidone (0.4M), VI(b) 2-piperidone (0.4M), VI(c) caprolactam (0.2M) and 2-piperidone (0.2M). The product in each case is an excellent, flame resistant foam, with slight changes in physical properties with the different oxoimines.

EXAMPLE VII

The procedures of Example I are repeated except that the heating step is accomplished using a microwave oven. The powder is placed in the oven and a power of about 1.0 KW is applied for about 6 minutes. Rapid melting and expansion result, producing an excellent resilient foam after about 6 minutes.

EXAMPLE VIII

About 322 3 g. (1M) of BTDA, about 22.6 g. (0.2M) caprolactam and about 250 g. methyl alcohol are placed in a 3 liter flask and reflexed for about 40 minutes (about 75° C.). The mixture is then cooled to about 50° C. About 168.5 g. (0.85M) of 4.4'-diaminodiphenyl methane and about 5 g. BRIJ 78 surfactant are added, the mixture is heated to reflux, and reflux is continued for about 20 minutes. The resulting thick, syrup-like liquid is poured into a shallow aluminum dish and allowed to dry overnight. The dry residue is broken up into granules which are spread onto an aluminum foil sheet and heated in an oven at about 240° C. After about 25 minutes of heating, the material is found to have expanded into a flexible, resilient foam sheet having a homogeneous cell structure. When exposed to direct flame the material does not emit smoke or toxic gases.

EXAMPLE IX

The procedure of Example I are repeated, except the following agents are used in place of the caprolactam: IX a; 26.2 g. (0.2M) of 6 amino caproic acid; IX b, 52.6 (0.4M) 6 amino cparoic acid; IX c, 13.15 g. (0.1M) 6 amino caproic acid and 11.3 g. (0.1M) caprolactam; IX d, 29.3 g (0.25M) 5-amino valeric acid; IXe, 25,75 g (0.25M of 4-amino butyric acid; IXf, 38.8 g (0.25M) 2-piperidone and IXg, 30,25 g (0.25M) 2-pyrrolidone. The foam produced by these examples have similar characteristics of flexibility, resiliency and density.

Although specific components, proportions and conditions have been specified in the above examples, these may be varied with similar results, where suitable. In addition, other materials may be added to the foamable material, such as fillers, colorants, ultraviolet absorbers, or the like.

Other applications, modifications and ramifications of the present invention will occur to those skilled in the art upon reading the present disclosure. These are intended to be included within the scope of the invention, as defined in the appended claims.

We claim:

1. The method of making a resilient, flame resistant modified polyimide foam having a selected compressive resistance which comprises the steps of:
    providing an aromatic dianhydride;
    mixing these with an agent selected from oxoimines, amino acids and mixtures thereof;
    the mole ratio of said agent to dianhydride between about 1.5:1 and just above 0:1;
    mixing therewith a suitable quantity of an alcohol;
    heating the mixture to a temperature of about 60° C. to 120° C. for 30 to 90 minutes to produce an ester;
    adding thereto a diamine;
    drying the resulting solution; and
    heating the dry material to a selected foaming temperature of from about 120° C. to about 320° C. for a period of from about 10 to about 60 minutes;
    whereby a resilient foam having a selected compressive resistance in accordance with the selected oxoimine to dianhydride mole ratio, the compressive resistance being inversely proportional to the oxoimine quantity.

2. A method according to claim 1 wherein the mole ratio of oxoimine to dianhydride is about 0.05:1, whereby the resulting foam has a high density and high compressive resistance.

3. The method according to claim 1 wherein the mole ratio of oxoimine to dianhydride is about 1.5:1, whereby the resulting foam has a low density and low compressive resistance.

4. The method according to claim 1 wherein said foaming temperature is in the range of from about 230° C. and about 320° C. and the resulting foam comprises primarily a polyimide.

5. The method according to claim 1 wherein said foaming temperature is in the range of from about 120° C. and about 220° C. and the resulting foam is primarily a polyimide-amide.

6. The method according to claim 1 wherein said aromatic dianhydride is pyromellitic dianhydride, 3,3',4,4'-benzophenone tetracarboxylic acid dianhydride or mixtures thereof.

7. The method according to claim 1 wherein said oxoimine has the general formula:

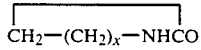

wherein "x" is an integer from 2 to 4.

8. The method according to claim 1 wherein said agent is selected from the group consisting of caprolactam, 2-piperidone, 2-pyrrolidone, 6-amino caproic acid, 5-amino valeric acid, 4-amino butyric acid and mixtures thereof.

9. The method according to claim 1 wherein said oxoimine is caprolactam.

10. The method according to claim 1 wherein said alcohol is methyl alcohol.

11. The method according to claim 1 wherein said diamine is 4,4'-diaminophenyl methane.

12. The method according to claim 1 wherein said diamine comprises at least two different diamines, at least one of which is an aromatic diamine and the other is an aliphatic diamine.

13. The method according to claim 12 wherein the mixed diamines are 4,4'-diamino diphenyl methane and 1,6-diamino hexane.

14. The method according to claim 1 further including the step of adding from about 0.01 to about 2 wt. % of a surfactant to the solution prior to drying.

15. The method according to claim 1 further including the step of adding fillers or reinforcing materials to the solution prior to drying.

16. The method of making a modified polyimide foam having a selected compressive resistance comprising a mixture of polyimide and polyimide-amide resins with the polyimide-amide predominating which comprises the steps of:
mixing together an aromatic dianhydride selected from pyromellitic dianhydride, 3,3',4,4'-benzophenone tetracarboxylic acid dianhydride and mixtures thereof and an oxoimine having the general formula:

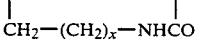

wherein "x" is an integer from 2 to 4, the mole ratio of oxoimine to dianhydride being selected within the range of from about 1.5:1 to about 1.05:1 in accordance with the final foam compressive resistance desired;
mixing therewith an effective quantity of an alcohol;
heating the mixture to a temperature of from about 60° to about 120° C. for from about 30 to about 90 minutes to react said dianhydride with said oxoimine to produce an N-substituted aliphatic imide and further to esterify said imide;
cooling the mixture to a temperature of from about 40° C. to about 70° C.;
adding thereto about 1.0M 4,4'-diaminodiphenyl methane per about 1.0M of dianhydride;
heating the resulting solution to reflux at a temperature of from about 70° C. to about 80° C. for a period of about 2 to about 30 minutes;
drying the solution at a temperature of from about 60° C. to about 70° C. for a period of about 60 to about 240 minutes to produce a dry material; and
foaming said dry material by heating to a temperature of about 120° C. to about 220° C. in a pre-heated oven for from about 10 to about 40 minutes;
whereby a resilient foam is formed having a selected compressive resistance in accordance with the selected oxoimine to dianhydride mole ratio, the compressive resistance being inversely proportional to the oxoimine quantity.

17. The method according to claim 16 wherein the mole ratio of oxoimine to dianhydride is about 0.05:1, whereby the resulting foam has a high density and high compressive resistance.

18. The method according to claim 16 wherein the mole ratio of oxoimine to dianhydride is about 1.5:1, whereby the resulting foam has a low density and low compressive resistance.

19. The method of making a modified polyimide foam having a selected compressive resistance comprising a mixture of polyimide and polyimide-amide with the polyimide predominating which comprises the steps of:
mixing together an aromatic dianhydride selected from pyromellitic dianhydride, 3,3',4,4'-benzophenone tetracarboxylic acid dianhydride and mixtures thereof and an oxoimine having the general formula:

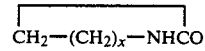

wherein "x" is an integer from 2 to 4, the mole ratio of oxoimine to dianhydride being selected within the range of from about 1.5:1 to about 0.05:1 in accordance with the desired final foam compressive resistance, said compressive resistance being inversely proportional to the oxoimine quantity;
mixing therewith from about 5 to 10 moles alcohol per 100 mole dianhydride,
heating the mixture to a temperature of from about 60° to about 120° C. for from about 30 to about 90 minutes to react said dianhydride with said oxoimine to produce an N-substituted aliphatic imide and substantially simultaneously esterify said imide;
cooling the mixture to a temperature of from about 40° C. to about 70° C.;
adding thereto about 1.0M 4,4'-diaminodiphenyl methane per about 1.0M of dianhydride;
heating the resulting solution to reflux at a temperature of from about 70° C. to about 80° C. for a period of about 2 to about 30 minutes;
drying the solution at a temperature of from about 60° C. to about 70° C. for a period of about 60 to about 240 minutes to produce a dry material; and
foaming said dry material by heating to a temperature of about 230° C. to about 320° C. in a pre-heated oven for about 30 to about 60 minutes;
whereby a resilient flame resistant modified polyimide foam having selected compressive resistance characteristics is produced, consisting primarily of polyimide resin.

20. The method according to claim 19 wherein the mole ratio of oxoimine to dianhydride is about 0.05:1, whereby the resulting foam has a high density and high compressive resistance.

21. The method according to claim 19 wherein the mole ratio of oxoimine to dianhydride is about 1.5:1, whereby the resulting foam has a low density and low compressive resistance.

22. The method according to claim 19 wherein the diamine added is a mixture of an aliphatic diamine and an aromatic diamine containing a methylene bridge.

23. The method according to claim 22 wherein the mixture of diamines is composed of 4,4'-diaminodiphenyl methane and 1,6-diamino hexane.

* * * * *